Figures 1, 2:
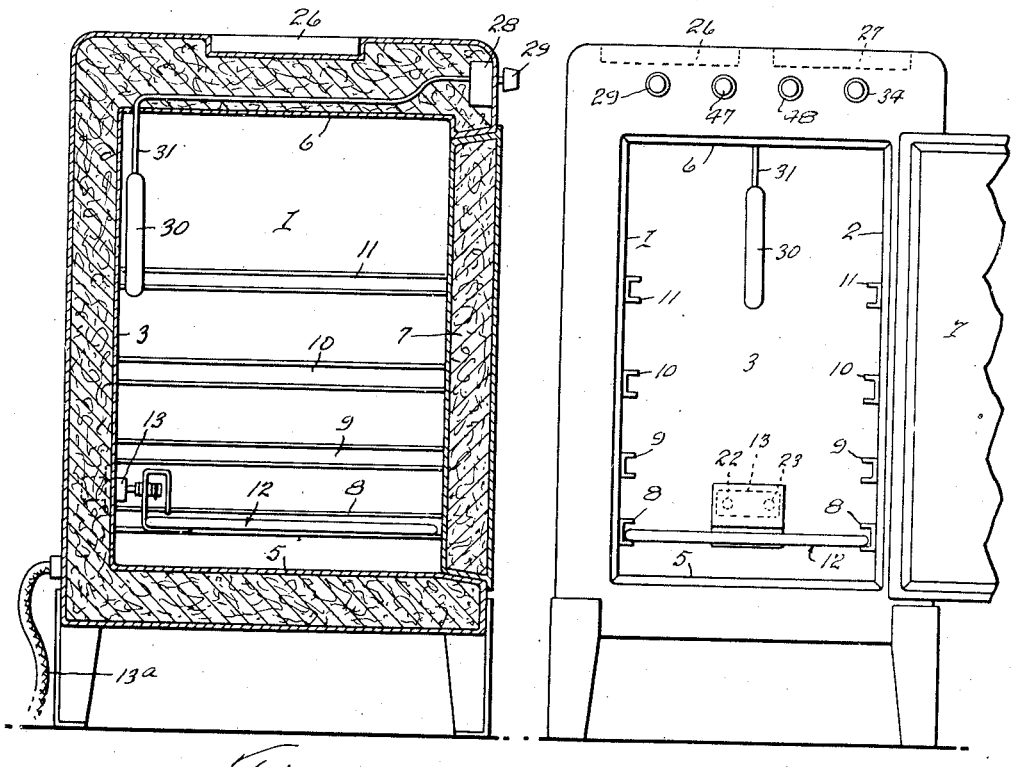

Feb. 1, 1938.  W. BAUER  2,107,173
ELECTRIC RANGE AND CONTROL SYSTEM THEREFOR
Filed Feb. 19, 1937   2 Sheets-Sheet 1

INVENTOR
William Bauer
BY
Hull, Brock & West
ATTORNEY.

Feb. 1, 1938.                 W. BAUER                    2,107,173
        ELECTRIC RANGE AND CONTROL SYSTEM THEREFOR
                 Filed Feb. 19, 1937        2 Sheets-Sheet 2

INVENTOR.
William Bauer
BY
ATTORNEY.

Patented Feb. 1, 1938

2,107,173

UNITED STATES PATENT OFFICE 2,107,173

ELECTRIC RANGE AND CONTROL SYSTEM THEREFOR

William Bauer, Mansfield, Ohio, assignor to The Tappan Stove Company, Mansfield, Ohio, a corporation of Ohio Application February 19, 1937, Serial No. 126,684

3 Claims. (Cl. 219—20)

This invention relates generally to an electric range and more particularly to an electric range having an oven heating element and one or more top heating elements which are connected in circuit with a thermostatic switch which serves to regulate the temperature within the oven and to alternate the current between the oven heating element and the top heating element or elements under certain conditions.

One of the objects of the invention is to provide a control system for electric ranges of the character described including a thermostat which serves to regulate the temperature within the oven and also to alternate the current between the oven heating element and the top heating elements in such a manner that both the oven heating element and the top heating element are not energized simultaneously.

The usual home is wired for a maximum capacity of 1650 watts, and if a larger wattage is required additional wiring is necessary. With the use of my control system I am able to make use of the present wiring installation without exceeding the permissive load and at the same time have sufficient current available to properly heat the oven and to operate the top burners for ordinary purposes such as frying or boiling on top of the stove. By the alternating action obtained by the thermostatic switch I am able to make use of approximately twice the connected load as would be possible without such a control. The oven heating unit and the top burners may be operated independently if desired. When the oven heating element is energized it will not require heat continuously and the surplus heat is available for top cooking. The heating elements for the top burners are also preferably arranged in refractory material so as to retain a considerable quantity of heat for top cooking.

A further object of the invention is to provide an electric range of the character described having an oven burner and one or more top burners and a thermal responsive device connected in circuit with said burners and disposed in the oven and adapted to regulate the temperature therein and including means for alternately and automatically energizing and deenergizing the oven burner and the top burner or burners depending upon the temperature within the oven, such device embodying also means for preventing both the oven burner and the top burner or burners from being energized simultaneously and thus throwing an excess load on the system.

Another feature of my invention resides in the oven heating element which is supported upon glides in the oven and which is reversible to adapt the range for baking or broiling. Positioned between the two lower oven glides is a receptacle which is so disposed that it may receive the heating element when it is inserted in either the upright or the inverted position which enables me to make use of a single heating element for baking or broiling instead of having two heating elements or two receptacles in the oven.

Figure 3:
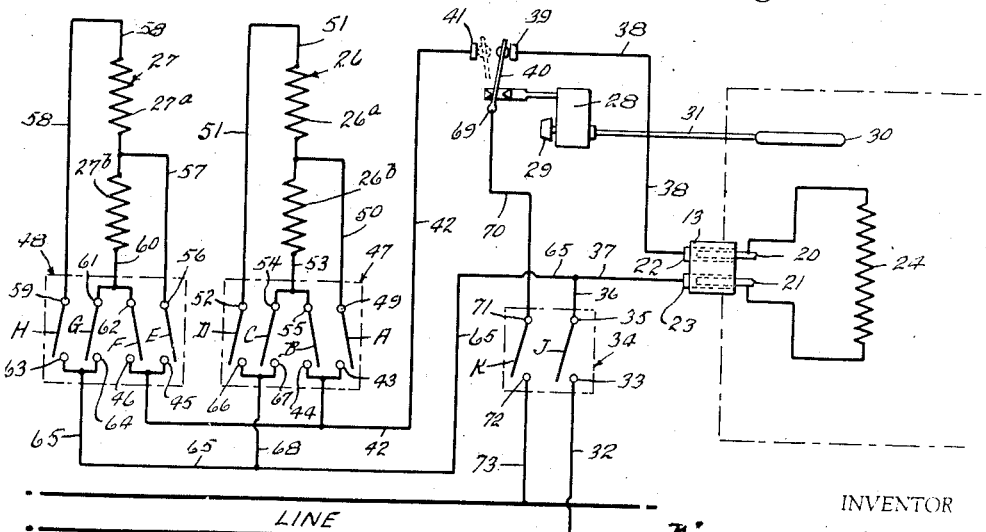
Figure 4:
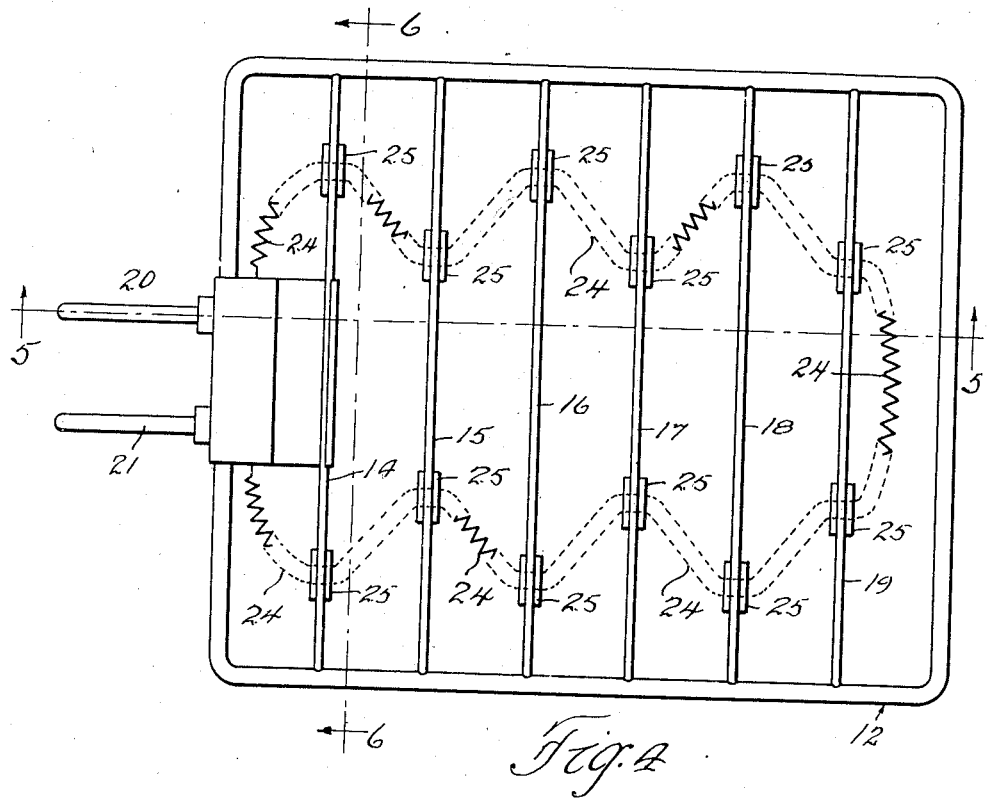
Figure 5:
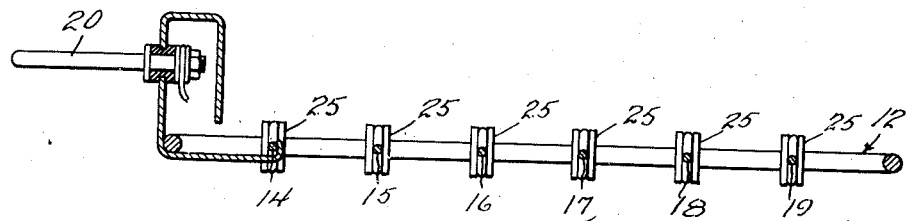
Figure 6:
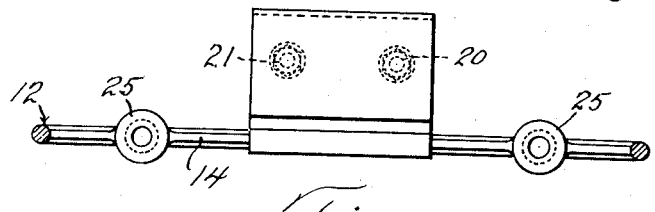

Further and more limited objects of the invention will appear as the description proceeds and by reference to the accompanying drawings in which Fig. 1 is a horizontal sectional view of my improved electric range showing the oven heating element in the baking position; Fig. 2 is a view in front elevation with the door of the range open to more clearly disclose the supports for the oven heating element; Fig. 3 is a diagrammatic view of the electrical connections; Fig. 4 is a top plan view of the oven heating element; Fig. 5 is a vertical sectional view on the line 5—5 of Fig. 4, and Fig. 6 is a vertical sectional view on the line 6—6 of Fig. 4.

Referring now to the drawings my range consists essentially of an oven compartment made up of side walls 1 and 2, a rear wall 3, a bottom wall 5 and a top wall 6. The front of the range is closed by a swinging door 7. The range is preferably insulated on all sides and at the top and bottom. The door 7 is also insulated so as to conserve the heat within the oven. Disposed within the oven and extending from front to rear thereof are a plurality of pairs of glides which are indicated by the reference characters 8, 9, 10 and 11. The two lower pairs of glides 8 and 9 serve to support the electrical heating element which is indicated generally by the reference character 12. Disposed at the rear of the range is a receptacle 13 which is connected with a suitable source of electric supply by means of a wire 13ᵃ. The receptacle 13 is preferably positioned midway between the glides 8 and 9 the purpose of which will hereinafter appear. The oven heating element is shown in detail in Figs. 4, 5 and 6 and consists essentially of a rectangular invertible frame of such size as to fit between the pairs of glides 8 and 9. Extending transversely of the frame are a plurality of bars 14, 15, 16, 17, 18 and 19. Disposed at the rear of the frame and projecting upwardly therefrom is a plug or jack which has a pair of prongs 20 and 21 which are received in sockets 22 and 23 in the receptacle 13. Electrically connected with the prong 21 is an electrical resistance wire 24 which extends about the frame as shown in Fig. 4 and is insulated therefrom by insulating blocks 25. The opposite end of the resistance wire is connected to the prong 20. The heating element may be inserted in the upright position between the pair of glides 8 or in the inverted position between the pair of glides 9 and when in the lower position the range is adapted for baking and when in the upper and inverted position, the range is adapted for broiling, the glides 8 then serving to receive a pan or rack which holds the material to be broiled. The glides 10 and 11 serve to support a suitable rack or shelf for baking. It will thus be seen that the heating element may be inserted into the oven in either the inverted or upright position depending upon whether it is desired to bake or broil; and that the receptacle 13 serves to connect the heating element with the source of current when in either position.

Disposed on top of the range are a pair of top heating elements which are indicated by the reference characters 26 and 27. The resistance wire of these heating elements is preferably embedded in refractory material so as to conserve the heat. Disposed at the front of the range is an adjustable thermostatic switch 28 which is controlled by a knob 29. The thermostatic switch per se forms no part of the present invention and may be purchased on the open market and the details of the same are therefore not illustrated. Either a single pole thermostat or a double pole thermostat may be used. In any case, however, one side of the line is always in contact. The line through the thermostat alternates between the oven element and the top element or elements automatically through thermostatic action. As the oven thermostat reaches the degree of heat as indicated by the setting thereof, the circuit to the oven heating element is first disconnected and the circuit then made to the top element or elements. When the oven cools sufficiently to produce thermostatic action, the circuit to the top element or elements is first disconnected and the circuit to the oven element is then again connected. The thermostat has a positive snap action and there is no neutral position. The oven element and the top elements may not be energized simultaneously. Standard switches may also be used to regulate or cut off the current from the top elements so that it is possible to use any one of the top heating elements in any heat capacity at any time without interfering with the other top heating element or without energizing the oven heating element. When the oven heating element is energized it will not require heat continuously and the surplus heat is available for top cooking. Disposed at the rear of the oven is a thermostat 30 which connects with the thermostatic switch 28 through a tube 31 and operates the same. The top heating elements are preferably of the type which permits them to operate at high, low or medium heat. Such heating elements are old and well known in the art.

In Fig. 3 there is a diagrammatic disclosure of the electrical connections. Leading from one side of the line is a wire 32 which connects with contact 33 of double pole switch 34. Leading from contact point 35 of switch 34 is a wire 36 which connects with a wire 37 which connects with the prong 21 to which is connected the resistance wire 24 of the oven heating element the opposite end of which is connected with prong 20 which is received in the socket 22. Leading from the socket 22 is a wire 38 which connects with contact point 39 which forms a part of the oven thermostat. The reference character 40 designates the thermostatic switch which contacts with either the contact point 39 or the contact point 41 of the thermostat switch. This thermostatic switch is a snap action switch which is controlled by the thermostat to move the switch to one contact point or the other automatically depending upon the temperature within the oven. When the thermostatic switch is set at zero the switch 40 is in contact with contact point 41 as shown in dotted lines in Fig. 3. Leading from the contact point 41 is a wire 42 which connects with the contact points 43, 44, 45 and 46 of the hand operated switches for the top burners which are designated generally by the reference characters 47 and 48. Leading from contact point 49 of switch 48 is a wire 50 which connects with the heating element of the top burner 26 which is made up of two sections 26ᵃ and 26ᵇ. Leading from the burner section 26ᵃ is a wire 51 which connects with contact point 52 of the switch 47. Leading from the burner section 26ᵇ is a wire 53 which connects with contact points 54 and 55 of switch 47. Leading from the contact point 56 of switch 48 is a wire 57 which connects with the top burner 27 which is made up of sections 27ᵃ and 27ᵇ. Leading from the section 27ᵃ is a wire 58 which connects with contact point 59 of switch 48. Leading from the burner section 27ᵇ is a wire 60 which connects with contact points 61 and 62 of switch 48. Connected with contact points 63 and 64 of switch 48 is a wire 65 which connects with the wire 37. Leading from contact points 66 and 67 of switch 47 is a wire 68 which connects with the wire 65. Leading from contact point 69 of the thermostatic switch is a wire 70 which connects with contact point 71 of switch 34 and leading from contact point 72 of switch 34 is a wire 73 which connects with the opposite side of the line. For convenience of description the switch levers of the top burners will be designated by the reference characters A, B, C, D, E, F, G and H. The switch levers of the master switch 34 are designated by the reference characters J and K. When it is desired to operate the top burners the master control switch 34 is closed to bring the arm J in contact with the point 33 and the arm K in contact with the contact point 72. Assuming that the thermostat which controls the oven is set at zero, the switch lever 40 will be in contact with the point 41. We will assume that it is desired to operate the burner 26 at low heat. The switch B will be moved over contact point 44 and the switch lever D over contact point 66. Current will then flow from the line through the wire 73, contact 72, switch lever K, contact point 71, wire 70, contact point 69, switch lever 40, contact point 41, wire 42, contact point 44, switch lever B, contact point 55, wire 53, burner section 26ᵇ, burner section 26ᵃ, wire 51, contact point 52, switch lever D, contact point 66, wire 68, wire 65, wire 36, contact point 35, switch lever J, contact point 33, wire 32, back to the other side of the line.

When it is desired to obtain medium heat from the burner 26 the switch lever A is moved over contact point 43 and switch levers B and C remain open. Assuming the control switch is closed current will then flow from the wire 42 through contact point 43, switch lever A, contact point 49, wire 50, burner section 26ᵃ, wire 51, contact point 52, switch lever D, contact point 66, wire 68, wire 65, wire 36, contact point 35, switch lever J, contact point 33, wire 32 to the opposite side of the line.

When high heat is desired from the burner 26 the switch lever A will be moved over contact point 43, the switch lever C will be moved over contact point 67 and switch lever D will be moved over contact point 66. Switch lever B will remain open. Current will flow from the wire 42 through the contact point 43, switch lever A, contact 49, wire 50, burner section 26ᵇ, wire 53, contact point 54, switch lever C, contact point 67, wire 68, wire 65, wire 36, contact point 35, switch lever J, contact point 33, wire 32 to the opposite side of the line. Current will also flow from the wire 50 through burner section 26ª, wire 51, contact point 52, switch lever D, contact point 66, wire 68 to wire 65 and thence back to the opposite side of the line. The burner sections 26ª and 26ᵇ are composed of two resistance wires of equal length and resistance and connected in the center. Connected singly these resistance wires give medium heat and connected in parallel they give high heat and connected in series they give low heat.

The circuit for the top burner 27 will not be described in detail but is identical with that described in connection with burner 26.

Switch 34 is an on and off master switch and controls all current passing through the oven and top elements. When switch lever K is moved over contact point 72 and switch lever J is moved over contact point 33 current will flow through the wire 32, contact point 33, switch lever J, contact point 35, wire 36, wire 37, socket 23, prong 21, thence through the oven heating element 24, prong 20, socket 13, wire 38, contact point 39, switch lever 40, contact point 69, wire 70, contact point 71, switch lever K, contact point 72, wire 73 to the opposite side of the line. When the oven has reached the temperature for which the thermostat has been set, the thermostat will be automatically operated to move the switch lever 40 into contact with the contact point 41 whereupon one or both of the top burners may be operated at high, low or medium heat in the manner hereinbefore described.

If the thermostat is set at zero current will not flow to the oven because the line will be broken but the top burners may be operated as desired. The thermostat may be set for varying degrees of heat as desired. When the oven has been operated and has cooled sufficiently the switch lever 40 is again moved by thermostatic action into contact with contact point 39 whereupon the oven heating element will be again energized and the circuit to the top burners broken.

It will thus be seen that the top burners may be operated intermittently depending upon the temperature within the oven and that whenever the oven is at or above the temperature for which the oven thermostat is set, the top burners will be energized. It is important to note, however, that the circuit to the oven heating element is broken before the circuit to the top burners is made, so that at no time will both the oven heating element and the top heating elements be energized simultaneously, which prevents an excess load being applied to the circuit even for a short period of time which would be likely to overload the circuit or to cause the burning out of fuses.

It will now be clear that I have provided an electric range and control system therefor which will accomplish the objects of the invention as hereinbefore stated. It is to be understood that various changes may be made in details of arrangement and construction without departing from the spirit of my invention as the embodiment of the invention herein disclosed is to be considered as merely illustrative and not in a limiting sense. I may use either a bi-metal thermostat or a hydraulically operated thermostat or I may use either a double pole thermostat or a single pole thermostat. However, in any case the thermostatic switch is adjustable and adapted to automatically control the temperature within the oven and serves also to alternate the current between the oven heating element and the top burner or burners and prevents the closing of the circuit to both the oven heating element and the top burner or burners simultaneously.

Having thus described my invention, what I claim is:

1. In an electric range of the character described, the combination of an enclosed burner and an exposed burner, an adjustable thermostat associated with and responsive to heat generated by the enclosed burner and unaffected by the operation of the exposed burner, a feed line connected with said thermostat and having branches therebeyond connected respectively with the exposed burner and the enclosed burner, said thermostat being operable to prevent simultaneous supply of current to both burners and serving to maintain the enclosed burner in operation until a predetermined temperature is reached and then to automatically deenergize the enclosed burner and to energize the exposed burner until the temperature adjacent the enclosed burner falls below a predetermined point and then to automatically deenergize the exposed burner and to energize the enclosed burner, said exposed burner being operable only when the temperature adjacent the enclosed burner is above a predetermined point at which the thermostat is set.

2. In an electric range of the character described having an oven, the combination of an oven burner and a plurality of exposed top burners, an adjustable thermostat disposed within said oven and responsive to the heat generated by said oven burner and unaffected by the operation of the top burners, a feed line connected with said thermostat and having branches therebeyond connected respectively with the top burners and the oven burner, said thermostat having a pair of spaced contact points and a switch adapted to be moved automatically from one contact point to the other so as to render operable either the oven burner or said top burners, said top burners being operable only when the temperature in the oven is above a predetermined point at which the thermostat is set, said contact points and thermostatic switch being so arranged and disposed as to prevent simultaneous supply of current to the oven burner and to the top burners.

3. In an electric range of the character described having an oven, the combination of an oven burner and a plurality of exposed top burners, an adjustable thermostat disposed within said oven and responsive to the heat generated by said oven burner and unaffected by the operation of the top burners, a feed line connected with said thermostat and having branches therebeyond connected respectively with the top burners and the oven burner, said thermostat having a pair of spaced contact points and a switch adapted to be moved automatically from one contact point to the other so as to render operable either the oven burner or said top burners, said top burners being operable only when the temperature in the oven is above a predetermined point at which the thermostat is set, said contact points and thermostatic switch being so arranged and disposed as to prevent simultaneous supply of current to the oven burner and to the top burners, and means permitting independent operation of either or both of said top burners or said oven burner.

WM. BAUER.